(12) United States Patent
Weix et al.

(10) Patent No.: US 10,808,454 B1
(45) Date of Patent: Oct. 20, 2020

(54) SANITARY RETRACTABLE BARRIER SYSTEM

(71) Applicant: Sanitary Barriers LLC, St. Paul, MN (US)

(72) Inventors: John A. Weix, St. Paul, MN (US); Megan F. Weix, St. Paul, MN (US)

(73) Assignee: Sanitary Barriers LLC, St. Paul, MN (US)

( * ) Notice: Subject to any disclaimer, the term of this patent is extended or adjusted under 35 U.S.C. 154(b) by 0 days.

(21) Appl. No.: 16/879,962

(22) Filed: May 21, 2020

Related U.S. Application Data

(60) Provisional application No. 63/026,450, filed on May 18, 2020.

(51) Int. Cl.
*E06B 9/08* (2006.01)
*A47G 5/02* (2006.01)
(Continued)

(52) U.S. Cl.
CPC ............. *E06B 9/08* (2013.01); *A47G 5/02* (2013.01); *B60R 21/06* (2013.01); *B60R 21/12* (2013.01);
(Continued)

(58) Field of Classification Search
CPC ............ E06B 9/08; E06B 2009/002; E06B 2009/543; B60R 21/12; B60R 21/06; A47G 5/02; A47F 2010/065
See application file for complete search history.

(56) References Cited

U.S. PATENT DOCUMENTS 3,931,994 A * 1/1976 Palmiter ............ B60H 1/00592
                                                296/24.4
4,818,007 A * 4/1989 Mahoney ............... B60J 1/2011
                                                160/370.21
(Continued)

FOREIGN PATENT DOCUMENTS

WO    WO2007059603    5/2007

OTHER PUBLICATIONS

Akon Skirting and Bellows, May 2019, retrieved from http://web.archive.org/web/20190520020724/https://skirting-and-bellows.com/industrial-roll-up-guards/retractable-welding-screen/ (Year: 2019).*

*Primary Examiner* — Katherine W Mitchell
*Assistant Examiner* — Abe Massad
(74) *Attorney, Agent, or Firm* — Merchant & Gould P.C.

(57) ABSTRACT

Sanitary barrier systems and methods for preventing transmission of biological substances and protecting human health are provided. A retractable barrier system may include a first supporting member and a barrier film. The first supporting member may comprise a first attachment element configured to position the barrier system vertically in use. The barrier film may have a fixed edge and a free edge, wherein the fixed edge is connected to the first supporting member. The barrier film is extendible to a desired length in a use configuration and retractable back on the first supporting member in a storage configuration. The barrier system may include a retracting mechanism such as a crank or a spring-loaded roller. The barrier film may comprise a sanitary portion. The barrier system may be combined with stanchions or queue barriers to protect individuals waiting in lines. The barrier system may also be used to provide barrier inside a multi-person vehicle.

25 Claims, 12 Drawing Sheets

(51) Int. Cl.
    *B60R 21/06*     (2006.01)
    *E06B 9/00*     (2006.01)
    *E06B 9/54*     (2006.01)
    *B60R 21/12*     (2006.01)

(52) U.S. Cl.
    CPC ... *E06B 2009/002* (2013.01); *E06B 2009/543* (2013.01)

(56) References Cited

U.S. PATENT DOCUMENTS

| | | | | |
|---|---|---|---|---|
| 5,207,260 | A * | 5/1993 | Commesso | B60P 7/135 160/135 |
| 5,505,244 | A * | 4/1996 | Thumann | E06B 9/54 160/23.1 |
| 5,875,597 | A * | 3/1999 | Gingrich | A47G 5/02 160/135 |
| 6,105,653 | A * | 8/2000 | Armstrong | B60H 1/00592 160/120 |
| 6,435,254 | B1 * | 8/2002 | Todd | A47K 3/38 160/309 |
| 6,575,435 | B1 | 6/2003 | Kotzen | |
| 7,219,709 | B1 | 5/2007 | Williams | |
| 7,377,490 | B1 * | 5/2008 | Khosravian | E01F 13/028 119/416 |
| 9,074,331 | B2 | 7/2015 | Stender et al. | |
| 9,714,491 | B2 * | 7/2017 | Wettern | E01F 13/028 |
| 10,011,985 | B2 * | 7/2018 | Strong | E06B 9/08 |
| 10,100,574 | B2 | 10/2018 | Reiner et al. | |
| 2007/0289547 | A1 | 12/2007 | Haugh et al. | |
| 2010/0288450 | A1 * | 11/2010 | Bruck | F16M 11/24 160/238 |
| 2017/0325605 | A1 * | 11/2017 | Korn | E06B 9/42 |
| 2017/0354143 | A1 * | 12/2017 | Rolfe | A01N 25/34 |
| 2019/0063018 | A1 | 2/2019 | Reiner | |

* cited by examiner

SANITARY RETRACTABLE BARRIER SYSTEM

CROSS REFERENCE TO RELATED APPLICATIONS

This application claims the benefit of U.S. Appln. No. 63/026,450, filed May 18, 2020, the disclosure of which is incorporated by reference in its entirety.

INTRODUCTION

Human health is impacted by a variety of biological substances encountered on a daily basis. In particular, contact with various biological substances transmitted in a public environment can lead to an illness, possibly severe, in mammals. For example, biological contamination can lead to a variety of illnesses or diseases, including, but not limited to, microbial infection, viral infection, food poisoning, streptococcal infection, anthrax, cold sores, conjunctivitis, coxsackievirus, croup, diphtheria, and ebolic hemorrhagic fever.

Microbes such as bacteria and viruses are often carried by biological substances such as body fluids from cough, sneeze, breath, sweat, and saliva. Highly-contagious microbes can cause severe outbreaks of disease among living persons through person-to-person transmission in public areas such as supermarkets, public transportation spaces, socially-active places, and schools. Particularly, in restricted or confined or crowded public areas such as ticketing and check-in lines of airport and multi-person vehicles, hospitals, security lines, State & Federal buildings, colleges/universities/high schools/middle schools/grade schools, public transportation vehicles like Uber/Lyft/Taxi/Driving Services, churches, restaurants, persons are always in close proximity with each other, and transmission of biological substances inevitably leads to widespread illness and diseases among persons without effective sanitary protection. In many public areas, common sanitary means such as hand washing sources or facial masks are often not available nor accessible nor applicable.

Protective barriers between individuals are conventionally constructed of ridged plastic and are permanently installed. Flexible plastic barriers such as high speed garage doors are typically installed in a permanent location. In automotive applications plastic ridged sheets are permanently installed between front and back seats and cannot be removed. In severe pandemic situations where social distancing is demanded, it would be very difficult to prevent transmission of highly contagious biological substances using conventional protective means in crowded public areas described above. Accordingly, it is highly desirable for portable, easy-to-establish, cost-effective, and reusable sanitary barrier systems to reduce or prevent transmission of harmful biological substances and protect human health.

Sanitary Retractable Barrier System

The present disclosure generally relates to sanitary barrier systems and methods for reducing or preventing transmission of a biological substance and protect living organisms from illness and diseases.

In some aspects, the present disclosure relates to a barrier system comprising a first supporting member comprising a first attachment element, the first attachment element configured to position the barrier system, for example, vertically in use; a barrier film having a fixed edge and a free edge, wherein the fixed edge is connected to the first supporting member, wherein the barrier film is extendible to a desired length in a use configuration and retractable back on the first supporting member in a storage configuration. The barrier system may further comprise a first stabilizing member. The first attachment element of the barrier system may be removably attached to the first stabilizing member. The barrier system may further comprise a second supporting member, wherein the free edge of the barrier film is capable of being removably attached to the second supporting member. The barrier system may further comprise a retracting mechanism configured to exert a force retracting the extended barrier film back on the first supporting member in a storage configuration. The first supporting member of the barrier system is selected from the group consisting of a bar, a core, a casement, a column, a housing, and combinations thereof. The second supporting member is selected from the group consisting of a side wall, a bar, a core, a column, a casement, a housing, and combinations thereof. The retracting mechanism of the barrier system is selected from the group consisting of a crank, a lever, a loaded spring, or a biasing system. The first stabilizing member is selected from the group consisting of a base, a floor surface, an interior part of a multi-person vehicle, a stanchion, a queue barrier, a securable structure, or a weighted structure.

The barrier film according to the present barrier system described herein may be a substantially clear plastic film. The barrier film may have a thickness of about 0.5 mm to about 20 mm, or from about 1 mil to about 10 mil, or from about 3 mil to about 7 mil. The barrier film may have sufficient stiffness or rigidity to reduce deformation upon extension or retraction.

The barrier system described herein may have a sanitary portion, for example, an antimicrobial or disinfecting surface on at least one side of the barrier film. The barrier systems may comprise a sanitary mechanism configured to apply an antimicrobial or disinfecting layer on at least one side of the barrier film upon extension or retraction of the barrier film.

In some aspects, the present disclosure relates to a retractable barrier system comprising: an elongated housing having a first end, a second end, and a slotted opening between the first end and the second end, wherein the slotted opening is positioned along a longitudinal axis of the housing; an extendible and retractable barrier film having a height substantially equal to a length of the slotted opening, the barrier film comprising a fixed edge, a major portion, and a free edge, wherein the fixed edge is confined within the housing, the major portion is extendible through the slotted opening of the housing and retractable in a storage configuration within the housing; and a first adaptor positioned at the first end of the housing, the adaptor configured to removably attach to a top end of a first stanchion. The barrier film upon use is in a substantially upright or vertical position.

In embodiments, retractable barrier system further comprises a retracting mechanism configured to exert a force retracting the extended barrier film back into the housing. The retracting mechanism include but is not limited to a crank, a lever, a loaded spring, or a biasing system. In embodiments, the free edge of the barrier film comprises an attachment mechanism configured to removably attach to a receiving member. In embodiments, the receiving member comprises a second adaptor at a bottom end of the receiving member, the second adaptor configured to removably attach to a top end of a second stanchion.

In some aspects, the present disclosure relates to a retractable barrier system for use in a multi-person vehicle. The a retractable barrier system comprises: an elongated housing having a first end, a second end, a slotted opening between the first end and the second end, and a first attachment element, wherein the slotted opening is positioned along a longitudinal axis of the housing, wherein the first attachment element is adapted to connect to a first interior part of a multi-person vehicle; and an extendible and retractable barrier film having a height substantially equal to a length of the slotted opening, the barrier film comprising a fixed edge, a major portion, and a free edge, wherein the fixed edge is confined within the housing, the major portion is extendible through the slotted opening of the housing and retractable in a storage configuration within the housing.

In some embodiments, the height of the barrier film is from about 16 inches to about 84 inches.

In embodiments, the free edge of the barrier film comprises a second attachment mechanism configured to removably connect to a second interior part of a multi-person vehicle, thereby establishing a substantially vertical barrier inside a multi-person vehicle.

In embodiments, the retractable barrier system for use in a multi-person vehicle further comprises a receiving member capable of being removably attached to an interior part of the automobile. The receiving member is configured to receive and removably attach to the free edge of the extended barrier film, thereby establishing a vertical barrier within the multi-person vehicle. The receiving member is selected from the group consisting of a bar, a core, a casement, a column, a housing, and combinations thereof.

In embodiments, the retractable barrier system for use in a multi-person vehicle further comprises a retracting mechanism configured to exert a force retracting the extended barrier film back into the housing.

In some aspects, the present disclosure relates to a handheld barrier system comprising: a first supporting member having a first bar and a first handle; a second supporting member having a second bar and a second handle; and an extendible and retractable barrier film having a first edge and a second edge, wherein the first edge is fixed on the first bar and the second edge is fixed on the second bar, wherein the barrier film is biased to a retracted position, wherein at least a part of the barrier film is retracted on the first bar and at least a part of the barrier film is retracted on the second bar.

In some aspects, the present disclosure relates to a method of reducing transmission of a biological substance, the method comprising: (1) providing a barrier system comprising a first supporting member and a barrier film having a fixed edge fixed onto the first supporting member and a free edge, wherein the barrier film is extendible and retractable back on the first supporting member in a storage configuration; (2) extending the barrier film to a desired length; and (3) attaching the free edge of the barrier film to a second supporting member, thereby establishing a substantially vertical barrier. The barrier system may be any of the present barrier systems described herein. The first supporting member may comprise a first attachment element configured to removably attach to a first stabilizing member. The second supporting member may comprise a second attachment element configured to removably attach to a second stabilizing member. The first stabilizing member and the second stabilizing member may be each a stanchion apart from each other. Alternatively, the first stabilizing member is a first interior part of a multi-person vehicle, and the second stabilizing member is a second interior part of the multi-person vehicle, and the substantially upright barrier divide interior space and/or isolate persons in the multi-person vehicle. The present method may further comprises applying an antimicrobial or disinfecting layer onto at least one side of the barrier film.

Advantages of the present barrier systems and methods include: highly-effective in preventing transmissions of biological substance, time saving for establishing a sanitary barrier as it only requires one person to operate the system, cost efficient and environmental-friendly, portable and light weight so it can be carried and taken anywhere, easy to mount on to various structures, compatible with various stabilizing surfaces, retractable and easy to store, non-invasive, non-abusive and less stress, possible to establish continuous barrier to any desired length with sanitary, isolating, and guiding functions combined in one system.

In particular, the retractable barrier system of the present disclosure can be combined with stanchions or queue barriers or stabilizing surfaces to establish effective sanitary barrier isolating individual persons in close proximity and preventing transmission of biological substances there while waiting in lines in airports, supermarkets, cabins of public transportation vehicles, or other public areas.

The term "about" is used in conjunction with numeric values to include normal variations in measurements as expected by persons skilled in the art, and is understood have the same meaning as "approximately" and to cover a typical margin of error, such as +10% of the stated value. The term "about" also encompasses amounts that differ due to different equilibrium conditions for a composition resulting from a particular initial composition. Whether or not modified by the term "about," the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes having two or more compounds that are either the same or different from each other. It should also be noted that the term "or" is generally employed in its sense including "and/or" unless the content clearly dictates otherwise.

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure. In the following description, various embodiments of the present disclosure are described with reference to the following drawings, in which.

DETAILED DESCRIPTION

Figure 1:
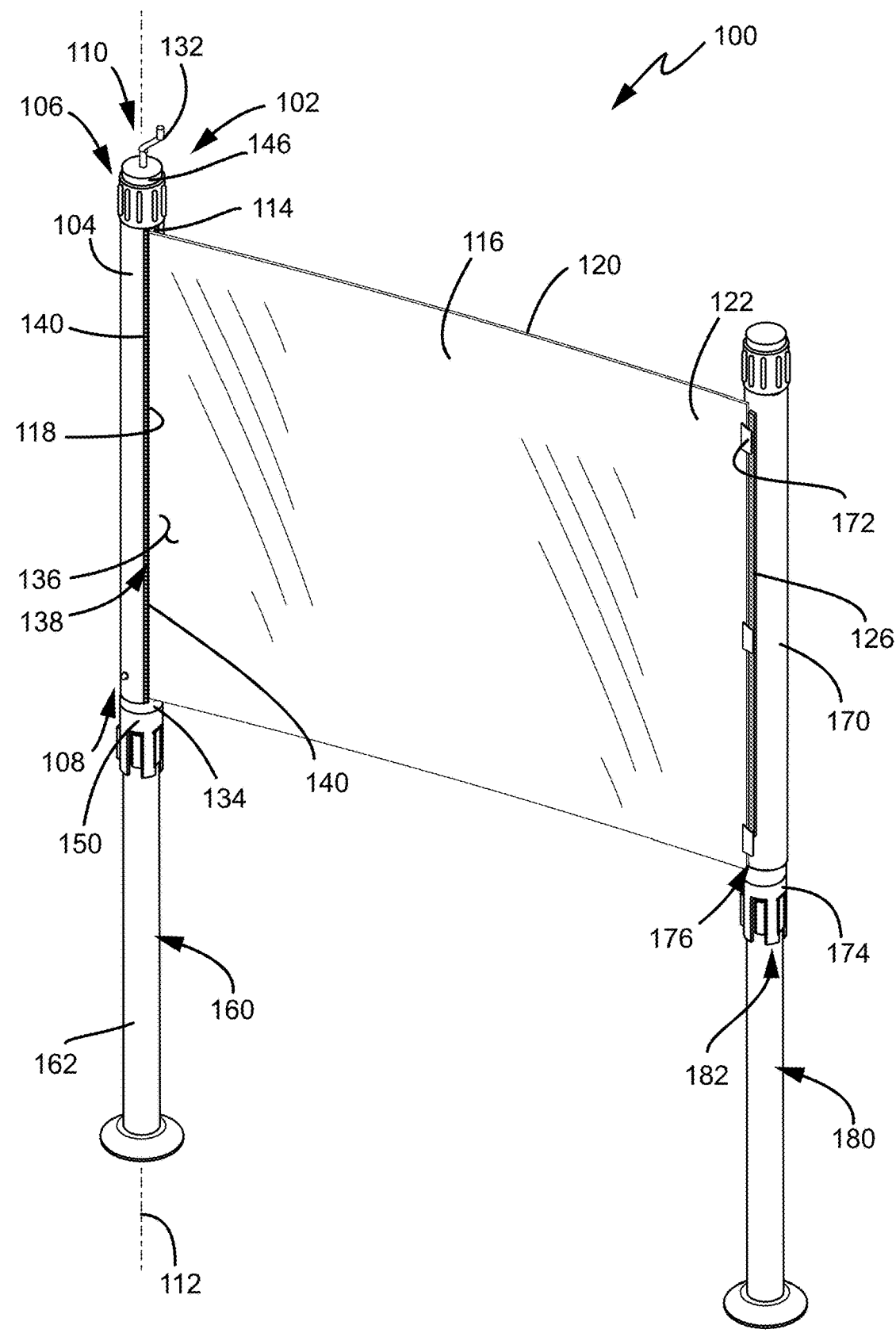
FIG. 1 is a perspective view of an embodiment of the retractable barrier system according to the present disclosure.
Figure 2:
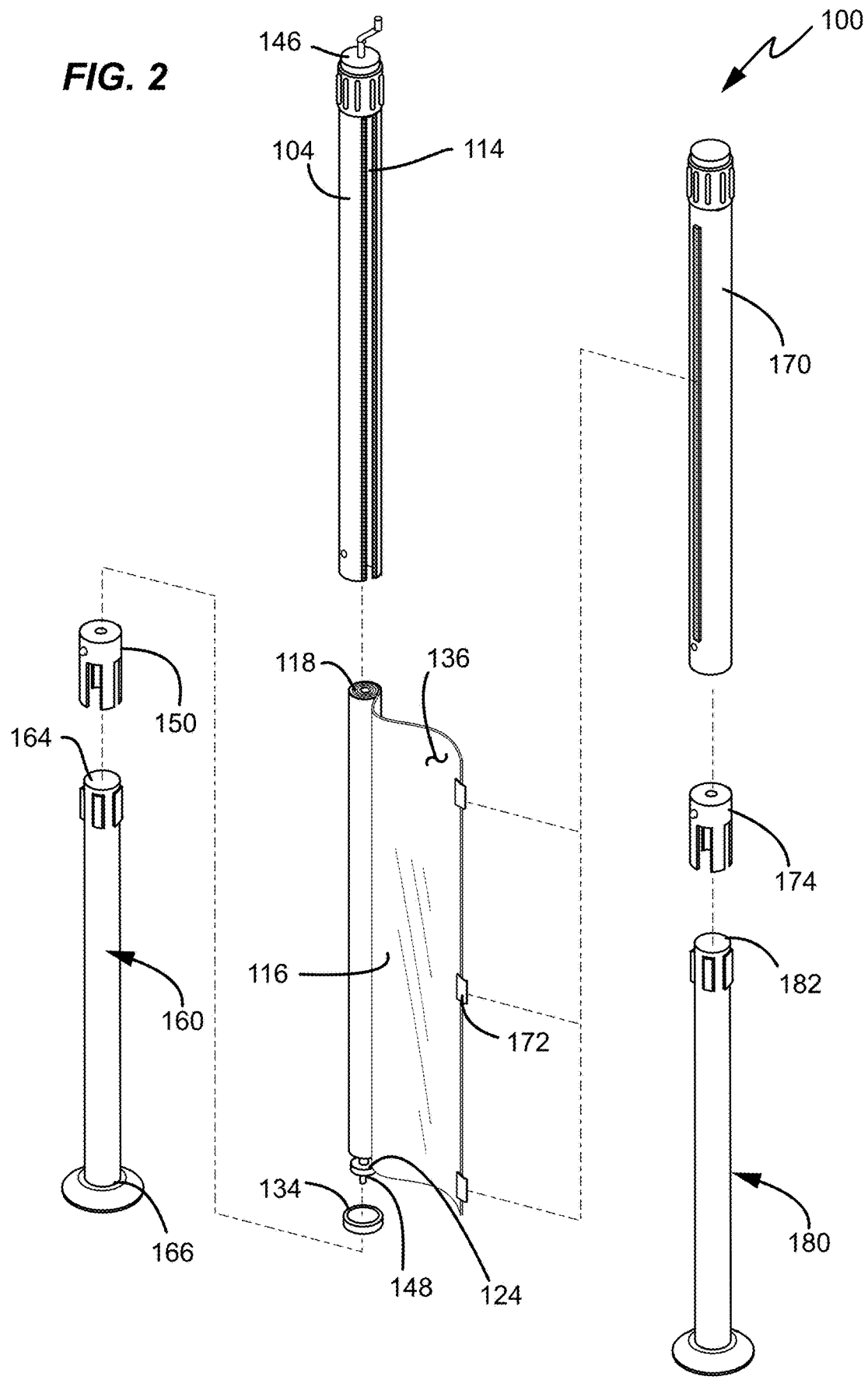
FIG. 2 is an exploded perspective diagram of exemplary components of a preferred, but not required, embodiment of the retractable barrier system of the present disclosure.
Figure 3:
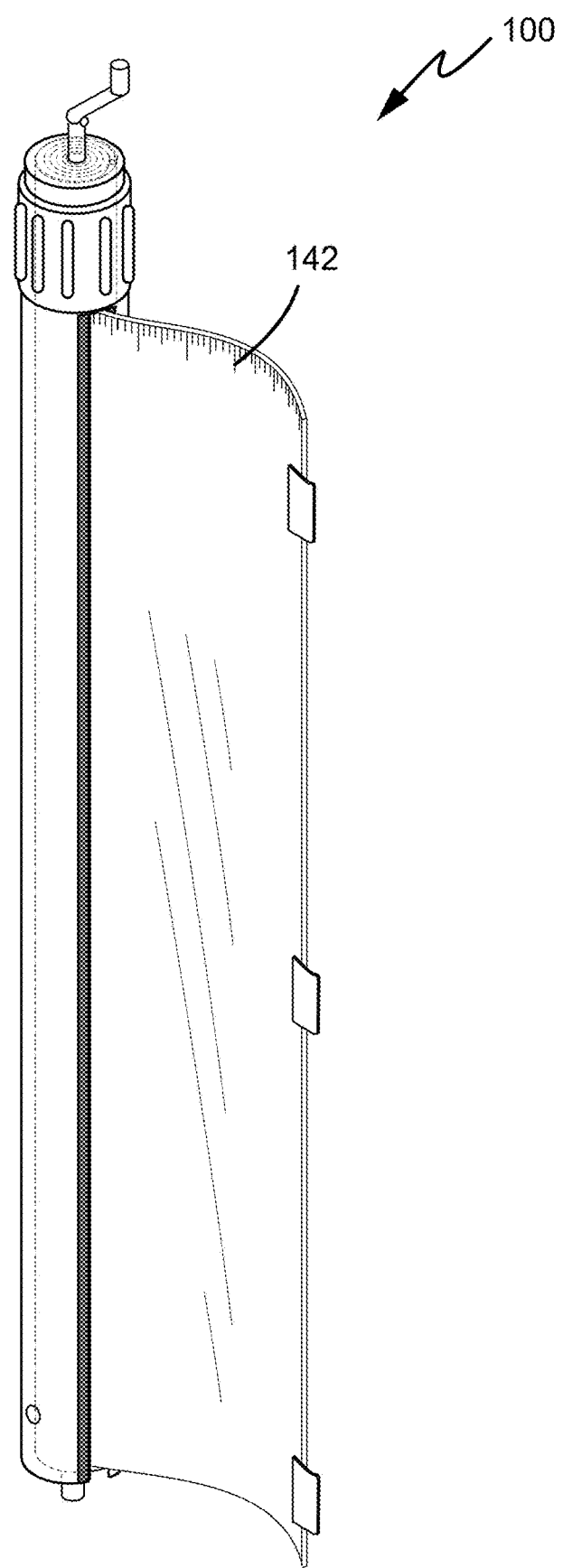
FIG. 3 is a perspective view of an embodiment of the retractable barrier system according to the present disclosure.

In some aspects, the present disclosure generally relates to a barrier system. The barrier system comprises a first supporting member comprising a first attachment element, the first attachment element configured to position the barrier system vertically in use; a barrier film having a fixed edge and a free edge, wherein the fixed edge is connected to the first supporting member, wherein the barrier film is extendible to a desired length in a use configuration and retractable back on the first supporting member in a storage configuration. Preferably, the barrier system includes a sanitary portion. In embodiments, the barrier film comprises an antimicrobial or disinfecting layer or portion or surface disposed on at least one side of the barrier film. The sanitary barrier film effectively kill the biological substances blocked by the barrier film. In embodiments, the barrier system may further comprise a first stabilizing member. The first attachment element of the barrier system may be removably attached to the first stabilizing member. In embodiments, the barrier system may further comprise a second supporting member, wherein the free edge of the barrier film is capable of being removably attached to the second supporting member. In embodiments, the barrier system may further comprise a retracting mechanism configured to exert a force retracting the extended barrier film back on the first supporting member in a storage configuration. The first supporting member of the barrier system is selected from the group consisting of a bar, a core, a casement, a column, a housing, and combinations thereof. The second supporting member is selected from the group consisting of a side wall, a bar, a core, a column, a casement, a housing, and combinations thereof. The retracting mechanism of the barrier system is selected from the group consisting of a crank, a lever, a loaded spring, or a biasing system. The first stabilizing member is selected from the group consisting of a base, a floor surface, an interior part of a multi-person vehicle, a stanchion, a securable structure, or a weighted structure.

In embodiments, a barrier system comprises a first supporting member comprising a first attachment element, the first attachment element configured to removably attach to a first stabilizing member and position the barrier system vertically in use. The barrier system further comprises a barrier film having a fixed edge and a free edge, wherein the fixed edge is connected to the first supporting member. The barrier system further comprises a second supporting member, wherein the free edge of the barrier film is capable of being removably attached to the second supporting member. The barrier film is extendible to a desired length in a use configuration and retractable back on the first supporting member in a storage configuration. In embodiments, the barrier system further comprises a first stabilizing surface and a second stabilizing surface, wherein the first supporting member removably attaches to the first stabilizing surface, and the second supporting member removably attaches to the second stabilizing surface, wherein the barrier system is substantially co-planar.

In embodiments, a barrier system comprises a plurality of first supporting member, each first supporting member comprising a first attachment element and a second attachment element. Each first attachment element is configured to removably attach to a first stabilizing member. The barrier system further comprises a plurality of barrier film, each barrier film having a fixed edge and a free edge, and each fixed edge is removably connected to each corresponding first supporting member. The barrier system further comprises a plurality of second supporting member, wherein the free edge of each barrier film is capable of being removably attached to the corresponding second supporting member. Each barrier film is extendible to a desired length in a use configuration and retractable back on the corresponding first supporting member in a storage configuration. The plurality of extended barrier films interconnect with each other, forming a continuous barrier that is able to isolate groups of persons in public area such as airports or check-in points. In embodiments, the barrier system further comprises a plurality of a first stabilizing surface and a plurality of a second stabilizing surface, wherein each of the first supporting member removably attaches to the corresponding first stabilizing surface, and each of the second supporting member removably attaches to the corresponding second stabilizing surface.

The barrier system described herein may be dimensioned to allow for applications in various environments. The housing and the barrier film may have various size, and/or length, and/or width depending on the application. In some example embodiments, the barrier film has a height from about 16 inches to about 84 inches.

In some aspects, the present disclosure relates to a method of reducing transmission of a biological substance, the method comprising: (1) providing a barrier system comprising a first supporting member and a barrier film having a fixed edge fixed onto the first supporting member and a free edge, wherein the barrier film is extendible and retractable back on the first supporting member in a storage configuration; (2) extending the barrier film to a desired length; and (3) attaching the free edge of the barrier film to a second supporting member, thereby establishing a substantially vertical barrier. The barrier system may be any of the present barrier systems described herein. The first supporting member may comprise a first attachment element configured to removably attach to a first stabilizing member. The second supporting member may comprise a second attachment element configured to removably attach to a second stabilizing member. The first stabilizing member and the second stabilizing member may be each a stanchion apart from each other. Alternatively, the first stabilizing member is a first interior part of a multi-person vehicle, and the second stabilizing member is a second interior part of the multi-person vehicle, and the substantially upright barrier divide interior space and/or isolate persons in the multi-person vehicle. The present method may further comprises applying an antimicrobial or disinfecting layer onto at least one side of the barrier film.

With reference now to the drawings, and in particular to FIGS. 1 through 8 thereof, a new retractable barrier systems embodying the principles and concepts of the disclosed subject matter will be described.

A retractable barrier system 100 may be suitable to form a barrier or obstruction across a space between two locations. Illustratively, the space may be a crowded public area and the two locations may be wherein two separate upright stanchions stand, and the divided space by the barrier allows effective isolation of persons and reduction of transmission of biological substances among persons. Those of ordinary skill in the art will recognize that the system 100 will be suitable for a variety of other applications.

In general, the barrier system 100 includes a barrier assembly 102, as shown in FIGS. 1A and 1B. The barrier assembly 102 includes substantially enclosed housing 104 having an extended body member 106 from a first end 108 to a second end 110 along a longitudinal axis 112. The housing 104 may be substantially cylindrical. The housing 104 has a slotted opening 114 along the longitudinal axis 112 of the body member 106. The slotted opening 104 may be dimensioned between the first end 108 and the second end 110, or alternatively extend from the first end 108, along the longitudinal axis 112. The slotted opening 114 has a width enough for passage of a sheet of a flexible substrate with thickness from about 0.5 mil to about 20 mil. The barrier assembly 102 includes an extendible and retractable barrier film 116. The barrier film 116 comprises a fixed edge 118, a major portion 120, and a free edge 122. The fixed edge 118 is enclosed and confined within the housing 104, and the major portion 120 is extendible through the slotted opening 114 and retractable in a storage configuration within the housing 104. The fixed edge 118 may be affixed to an interior part of the housing 104.

The housing 104 may comprise a rotatable structure 124 enclosed therein. The rotatable structure may be a bar, or a rod, or a column, or a core, or a hollowed core, or a roller, or a spindle, or an equivalent thereof. For the sole purpose of discussion, "roller" is used interchangeably with "rotatable structure" throughout the present disclosure. The fixed edge 118 is attached to the roller 124 through a fastening mechanism (not shown) such as adhesion by an adhesive or a tape or through a mechanical mechanism (not shown) such as screw or staple. In a storage configuration, the barrier film 116 is retracted onto the roller 124 in a roll form. The roller 124 with the barrier film rolled thereon may be configured to be slidably disposed into the housing 104 through the first end 108 and the slotted opening 114. An end of the roller is configured to removably attach to the second end 110 of the housing 104. The roller 124 may optionally comprise one or more shoulder washers or roller caps (not shown) known in the art, disposed at one or both ends of the roller 124 to support and/or guide winding and unwinding the barrier film 116. The barrier assembly 102 is configured to allow the unobstructed passage of the major portion 120 through the slotted opening 114 upon extension (unwinding the barrier film) or retraction (winding the barrier film). The free edge 122 may be placed outside the housing 104 in the storage configuration, which allows for easy extension of the barrier film 116 by pulling the free edge 122 to a desired length. The barrier assembly may comprise an edge holder or an edge protector 126 placed at the free edge 122. The edge holder or the edge protector 126 is configured to prevent the free edge 122 from being retracted through the slotted opening 114 into the housing 104. The edge holder or edge protector 126 may also protect the free edge 122 from damage or deformation upon use and reuse, extending the lifetime thereof. The edge holder or edge protector 126 may also provide convenience in handling and operating the barrier assembly 102. In the use configuration, the barrier film 116 may be extended to a desired length to establish a barrier in a substantially upright or vertical configuration. The barrier assembly 102 may be dimensioned to allow for applications in various environments. The housing and the barrier film may have various size, and/or length, and/or width depending on the application. In embodiments, the barrier film has a height from about 16 inches to about 84 inches.

The barrier system 100 may further include a retracting mechanism 130 configured to exert a force retracting the extended barrier film back into the housing 104. The retracting mechanism 130 may be a crank system comprising a crank handle 132 placed at the second end 110 of the housing 104. The crank handle 132 may be connected to the roller 124, enabling a user to rotate the roller. Optionally, the barrier assembly 102 may include an end cap 134 fixed to the second end 110 of the housing 104. The crank handle 132 and the roller 124 are connected through the end cap 134. In practice, the crank system provides convenience in operating the barrier system. A user can rotate the crank handle 132 and thereby rotate the roller to exert a force directing the retraction or winding of the extended barrier film back onto the roller 124 in a smooth and progressive manner.

The retracting mechanism 130 may alternatively be a lever, a spring-loaded roller, or a biasing system, or other suitable mechanisms. As an exemplary example, the roller 124 may be a spring-loaded roller 124 enclosed in the housing 104. The fixed edge 118 is fixed onto the spring-loaded roller 124, allowing the major portion 120 of the barrier film to be rolled onto the spring-loaded roller 124 in a storage configuration. The spring-loaded roller is in a manner known in the art for roller blinds or the like, so that the roller tends to rotate under influence of an internal spring, not shown, in a direction winding the barrier film onto the spring-loaded roller. As another exemplary example, the retracting mechanism 130 may be a biasing mechanism known in the art. The biasing system may comprise a spring-loaded roller 124 configured to bias towards the retracted position wherein the major portion 120 of the barrier film 116 is retracted onto the spring-loaded roller 124 in the storage configuration. In practice, the biasing system is operatively arranged to exert a force on the extended barrier film and urge the spring-loaded roller to rotate in a direction to wind the barrier film toward the biased position. It should be noted that a biasing mechanism is an optional feature that may be omitted from certain embodiments.

The barrier film 116 of the barrier assembly 102 may comprise a sanitary portion 136. For example, the barrier film 116 may be inherently antimicrobial, such as an extruded plastic film having an antimicrobial component added therein during the extrusion process. Alternatively, the sanitary portion 136 may be a layer of antimicrobial or disinfecting material disposed onto the barrier film. The antimicrobial or disinfecting material effectively kill the biological substances such as bacteria or virus blocked by the barrier film, thereby improving the sanitary efficiency of the barrier system. The antimicrobial or disinfecting material used herein is known in the art.

The barrier system 100 may further include a sanitary mechanism 138 configured to apply an antimicrobial or disinfecting layer to at least one side of the barrier film 116. As an exemplary example, the sanitary mechanism comprises at least one felt strip 140 (or fabric strip or the like) removably attached to a surface of the housing 104 near at least one side of the slotted opening 114 along the longitudinal axis 112. In embodiments, two separate felt strips 140 may be removably attached respectively to a surface of the housing near each side of the slotted opening 114, both along the longitudinal axis 112. The felt strip(s) is pre-impregnated with an antimicrobial or disinfecting liquid/composition (not shown) known in the art. The felt strip(s) 140 is configured to be in physical or pressured contact with at least one side of the barrier film 116 such that a portion of the pre-impregnated antimicrobial or disinfecting composition transfers onto the at least one side of the barrier film 116 upon extension or retraction of the barrier film 116. The sanitary mechanism 138 conveniently allows for repeated applications of a sanitary composition onto the barrier film upon using and reusing, dispensing the need of manual application such as wiping or spraying.

The barrier film 116 described herein may be a plastic film known in the art. Examples of plastic film include but are not limited to polyolefin film, polyvinylchloride film, polyester film, polyurethane film, cellophane film, or engineered plastic film. The plastic film has a thickness of about 0.5 mil to about 20 mil, or from about 1 mil to about 10 mil, or from about 3 mil to about 7 mil. The barrier film preferably has a stiffness or rigidity sufficient to reduce or prevent deformation upon extension or retraction in operation.

The barrier film barrier film 116 described herein may have various translucency or optical properties depending on the application. The barrier film barrier film 116 may be transparent, semi-transparent, see-through, substantially clear, translucent, or opaque. The barrier film 116 may optionally comprise a colored portion.

Optionally, the barrier film 116 may comprise a plurality of measure indicia 142 visibly guiding the extension of barrier film over a particular length of distance. The barrier film 116 may comprise a flexible frame 144 surrounding and protecting the barrier film. The barrier film 116 may include a high-performance coating (not shown) known in the art, including but not limited to high-density barrier coating, scratch-resistant hard coating, or cleanable/self-cleanable coating, or ink-receptive coating, imparting other useful and beneficial properties to the barrier system 100. The barrier film 116 may comprise a writable or printable portion (not shown) allowing to write, mark, print, sign, or label the barrier film for practical purposes such as displaying, decorating, reminding, warning, advertising, etc.

The barrier assembly 102 may further include another end cap 146 removably attached to the first end 108 of the housing 104. The end cap 146 may comprise a roller pin or a roller receiver 148 configured to support and removably attach to the roller 124 at the first end 108 of the housing 104, allowing the roller 124 to rotate freely. The barrier system 100 may include a first adaptor 150 positioned at the first end 108 of the housing 104. The first adaptor 150 can be permanently or removably affixed onto the first end 108 or the end cap 146 by a suitable mechanical means such as screw or bolt (not shown). The first adaptor 150 may be a universal connector configured to removably attach to a first stanchion 160. As known in the art, a stanchion is an upright stabilizing fixture. The stanchion 160 may comprise an elongated body member 162 having a top end 164, a bottom end 166, and a weighted base 168 placed at the bottom end 166 to stabilize the stanchion 160 and the object placed thereon. A stanchion used in the present disclosure may have an adjustable height. The universal connector 150 is configured to removably attach to the top end 164 of the stanchion 160 allowing the housing 104 and the first stanchion 160 be aligned in a substantially straight configuration along the longitudinal axis 112.

Figure 4:
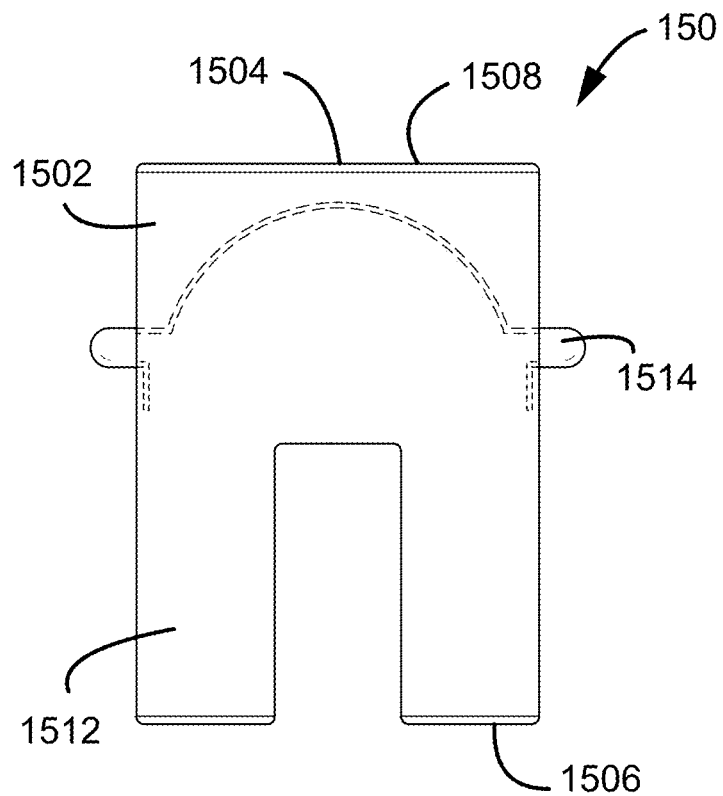
FIG. 4 is a side view of an embodiment of the adaptor according to the present disclosure.
Figure 5:
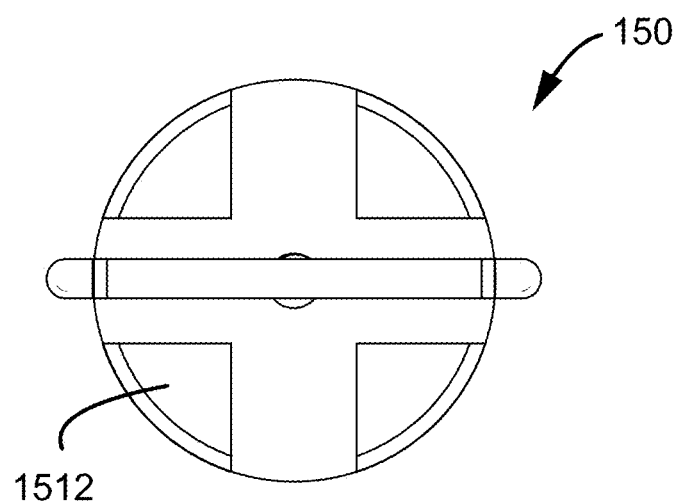
FIG. 5 is a bottom view of an embodiment of the adaptor according to the present disclosure.
Figure 6:
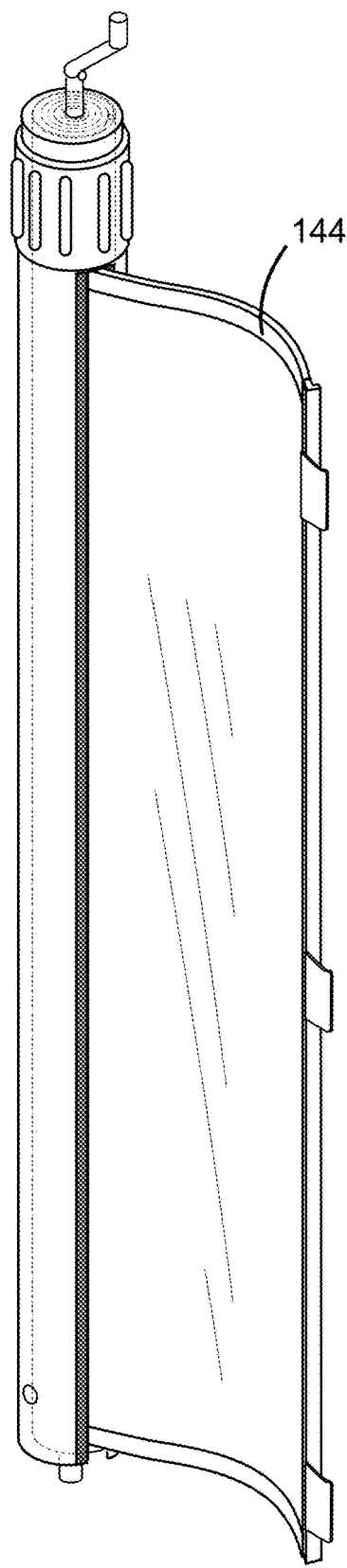
FIG. 6 is a perspective view of another embodiment of the retractable barrier system according to the present disclosure.

Now referring to FIGS. 4 and 5, an embodiment of the first adaptor 150 is described. The first adaptor 150 is a universal connector comprising a housing 1502 having a first end 1504 and a second end 1506, a bottom surface 1508 connected to the first end 1504, a sidewall 1510 connected to the bottom surface 1508, and four projections 1512 extending from the sidewall 1510 to the second end 1506. The bottom surface 1508 is configured to removably connect to the first end 108 of the barrier housing 104. The adaptor 150 may optionally comprise a locking mechanism 1514 connected to an interior surface of the housing 1502. A locking mechanism 1514 may be a coil spring or leaf spring configured to securely lock an object inserted into the housing 1502. The adaptor 150 is operably configured to receive and enclose the top end 164 of the first stanchion 160 in the housing 1502 and lock the top end 164 via the locking mechanism 1514, regardless of the size, shape, and configuration of the top end 164.

The barrier system 100 may further include a receiving member 170 configured to receive and removably attach to the free edge 122 of the extended barrier film 116 in a way that the receiving member 170, the extended barrier film 116, and the housing 104 are substantially co-planar. The receiving member 170 may be any possible supporting structure including but not limited to a bar, or a rod, or a column, or a core, a roller, or a hollowed core, or a receiving housing, or another housing 104 enclosing a separate barrier film. The barrier assembly 102 may comprise a fastening mechanism 172 configured to allow the free edge 122 to removably attach to the receiving member 170. The fastening mechanism 172 may be a removable adhesive or tape, a snap closure, a hook-and-loop closure, a VELCRO® type fastener, a latch, a clasp, a button closure, a magnetic closure, a bracket, a locking mechanism, or other suitable closure mechanism. For example, the barrier assembly 102 may comprise at least one VELCRO® type fastening strap 172 connected to the free edge 122 or the edge holder 126 of the barrier film 116. The at least one VELCRO® type fastening strap 172 is operably configured to removably attach to the receiving member 170. As another example, the barrier assembly 102 may comprise at least one hook 172 placed on the free edge 122 or the edge holder 126, and the receiving member 170 may comprise at least one loop 172 configured to securely couple to the corresponding hook on the free edge 122 or the edge holder 126. Alternatively, the receiving member can be a sidewall (not shown), and the free edge 122 or the edge holder 126 is configured to removably mount to the sidewall through a fastening mechanism according to the present disclosure.

The receiving member 170 may further comprise a second adaptor 174 positioned at a first end 176 of the receiving member 170. The second adaptor may be substantially identical in configuration to the first adaptor 150. The second adaptor 174 may be affixed to the first end 176 of the receiving member 170 via a suitable mechanical means such as screw or bolt (not shown). The second adaptor 174 may be another universal connector configured to removably attach to a top end 182 of a second stanchion 180 in a way similar to that of the first adaptor 150 described above. The barrier system 100 in use may have the housing 104, the barrier film 116, the receiving member 174, the first stanchion 160, and the second stanchion 180 aligned in a substantially upright and co-planar configuration.

Figure 7:
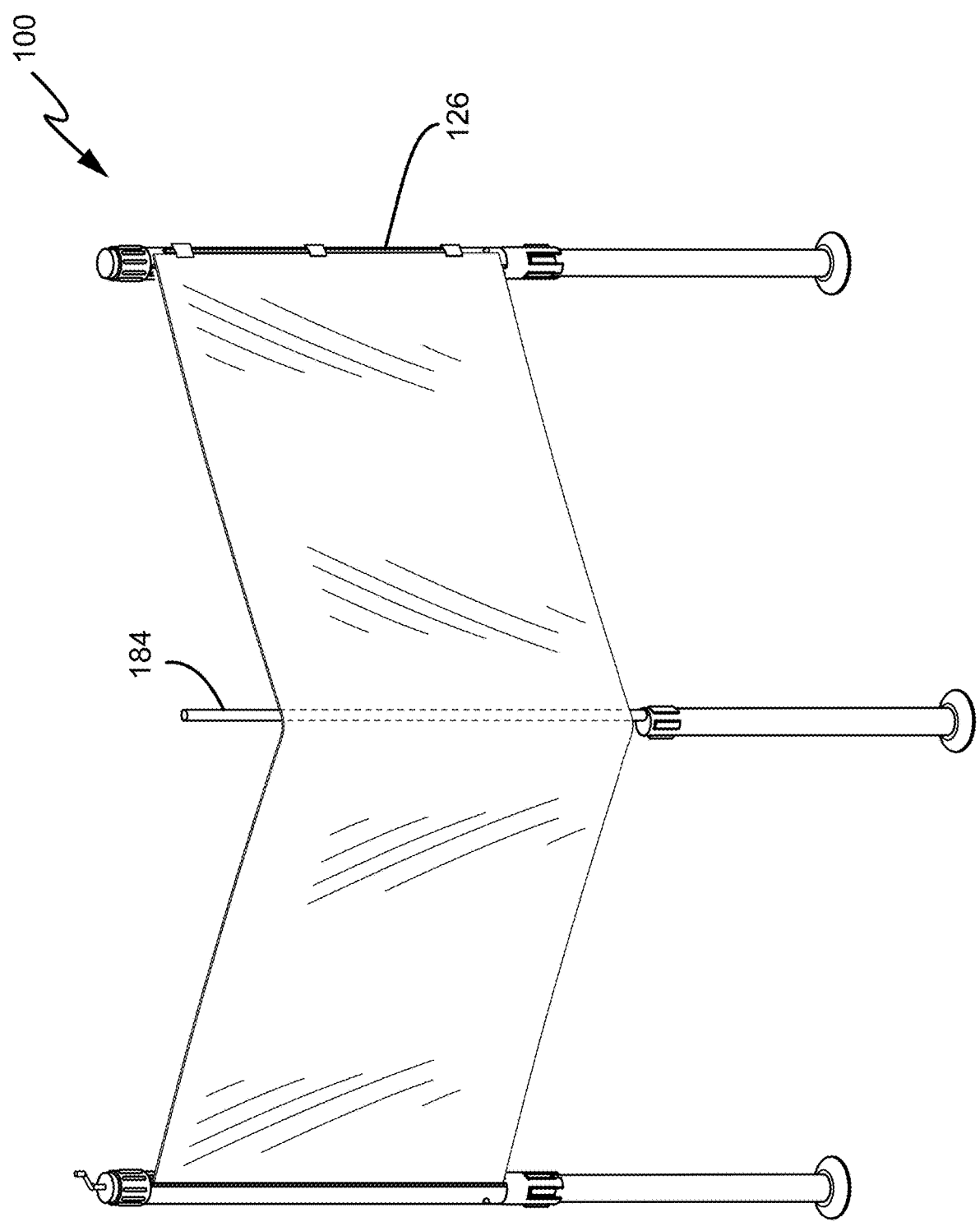
FIG. 7 is a perspective view of an embodiment of the retractable barrier system comprising at least one intermittent guide pole according to the present disclosure.

Now referring to FIG. 7, the barrier system 100 may optionally include one or more guide poles 184 between the first stanchion 160 and the second stanchion 180, and the one of more guide poles 184 are configured to support and guide the extended barrier film 116 over a long distance. Optionally, each of one or more guide poles 184 may be attached to an intermittent stanchion 186.

Figure 8:
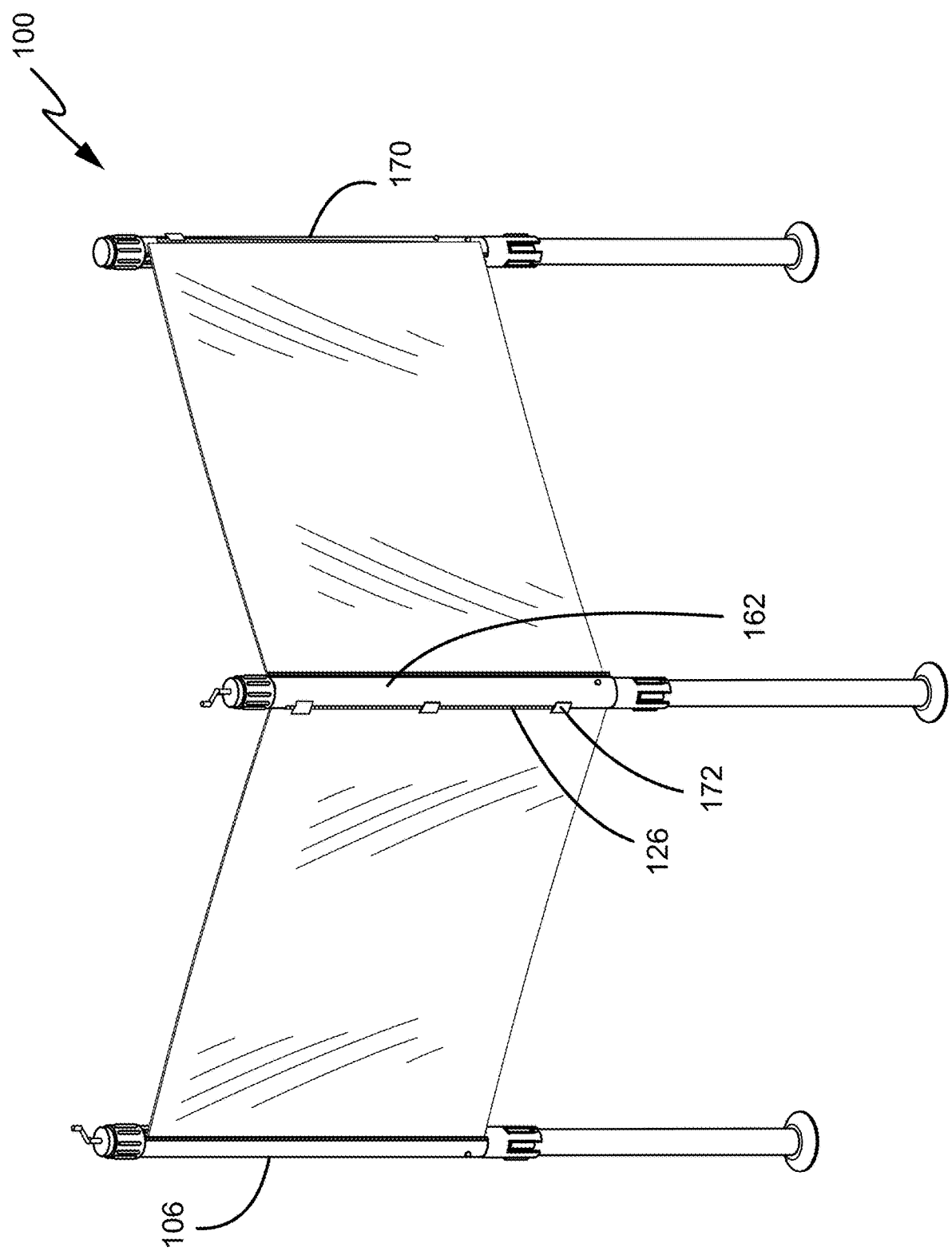
FIG. 8 is a perspective view of an embodiment of the retractable barrier system comprising a plurality of barrier assemblies according to the present disclosure.

Now referring to FIG. 8, the barrier system may include a plurality of barrier assemblies 102 as described herein. Each barrier assembly 102 includes a housing 104. Each housing 104 has an elongated body member 106 extended between a first end 108 and a second end 110. Each barrier assembly 102 may comprise an individual barrier film 116 enclosed therein, a slotted opening 114 thereof, a fastening mechanism 172 thereof, and an adaptor 150 configured to attach to the first end 108 thereof. Each barrier film 116 has a fixed edge 118, a major portion 120, and a free edge 122. The fastening mechanism 172 may be placed on the elongated body member or each of the housing 104. The free edge 122 of each barrier film 116 is configured to removably attach to another housing 102 via the fastening mechanism 172 thereof, according to the present disclosure. For example, each housing 104 has at least one hook-type fastener 172 placed thereon, and each free edge 122 has at least one loop-type fastener 172 configured to removably attach to the corresponding hook 172 of another housing 104 via a hook-loop fastening mechanism. Each adaptor 150 is configured to removably attach to a top end 164 of an individual stanchion 160. The barrier system 100 thus includes a plurality of interconnected barrier films 116 between every two adjacent housings 104, allowing to establish a continuous barrier over a long distance for isolating queues of persons.

In exemplary embodiments, a method of reducing transmission of a biological substance comprises: (1) providing a barrier system according to the present disclosure, wherein the barrier system comprises: an elongated housing having a first end, a second end, and a slotted opening between the first end and the second end, wherein the slotted opening is positioned along a longitudinal axis of the housing. In addition, an extendible and retractable barrier film having a height substantially equal to a length of the slotted opening, the barrier film comprising a fixed edge, a major portion, and a free edge. In some embodiments the fixed edge is confined within the housing, the major portion is extendible through the slotted opening of the housing and retractable in a storage configuration within the housing. Moreover, the barrier system, may include a first adaptor positioned at the first end of the housing, the adaptor configured to removably attach to a top end of a first stanchion. In some methods, a subsequent step includes extending the free edge of the barrier film to a desired length. In some examples, the method include a further step of attaching the free edge of the barrier film to a receiving member, wherein the receiving member comprises a second adaptor connected to a first end of the receiving member.

In embodiments, the method further comprises: attaching the first adaptor of the barrier system to a top end of a first stanchion, and attaching the second adaptor of the receiving member to a top end of a second stanchion, thereby establishing a barrier between the first stanchion and the second stanchion in a substantially upright configuration. The method may further comprise applying an antimicrobial or disinfecting layer onto at least one side of the barrier film.

Figure 9:
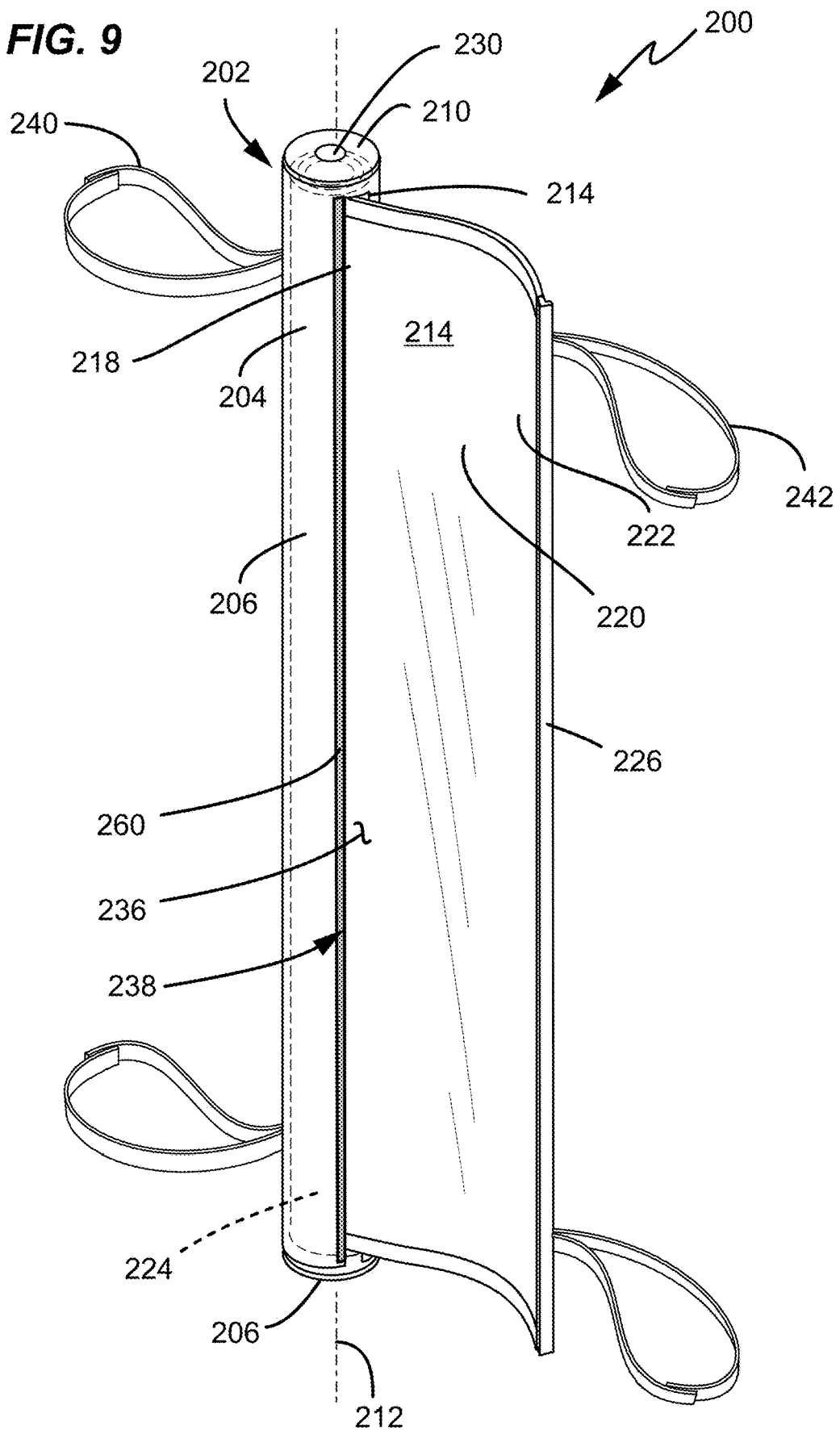
FIG. 9 is a perspective view of an embodiment of the retractable barrier system for use in a multi-person vehicle, according to the present disclosure.
Figure 10:
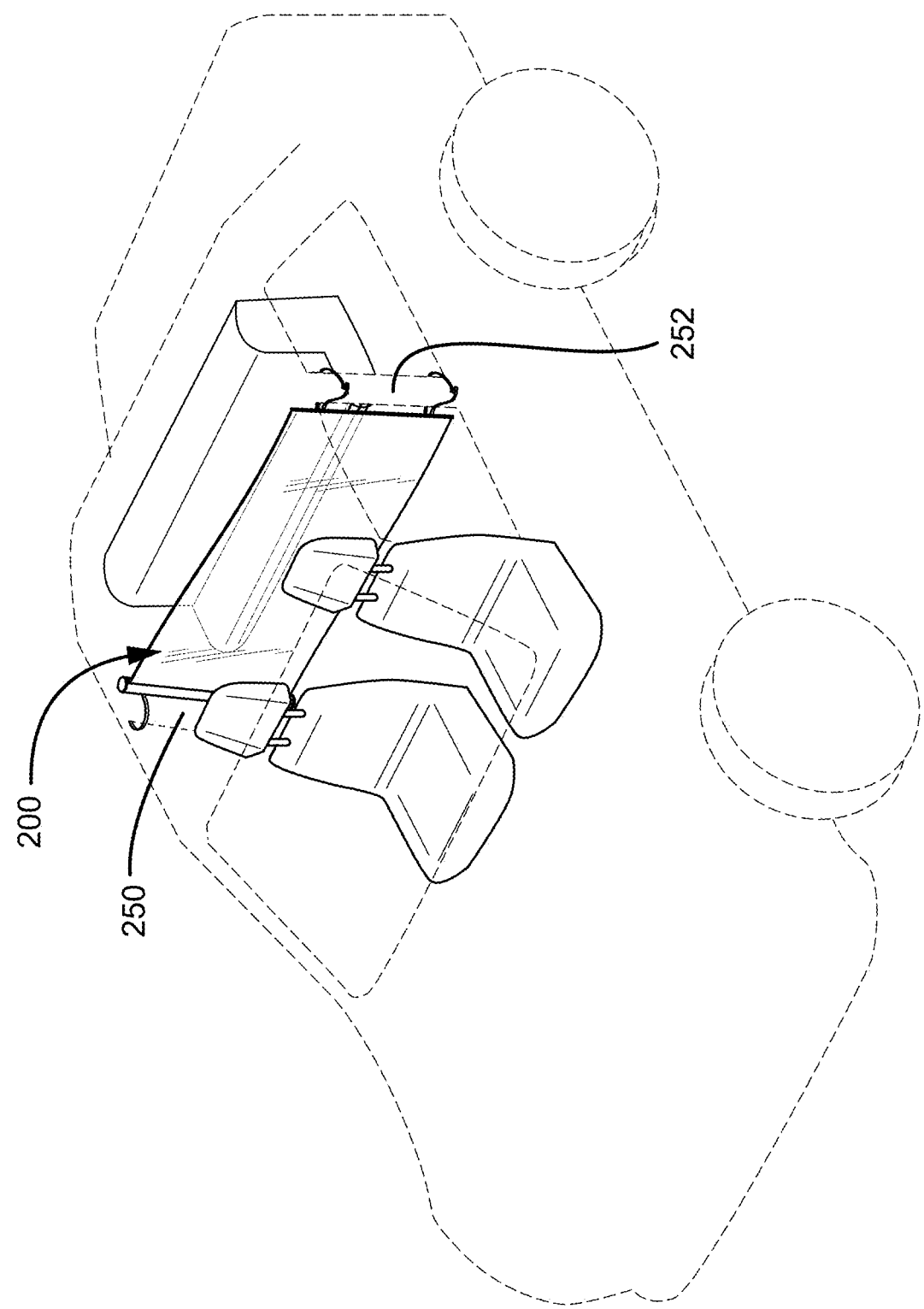
FIG. 10 is a perspective view of an embodiment of the retractable barrier system established in a multi-person vehicle, according to the present disclosure.
Figure 11:
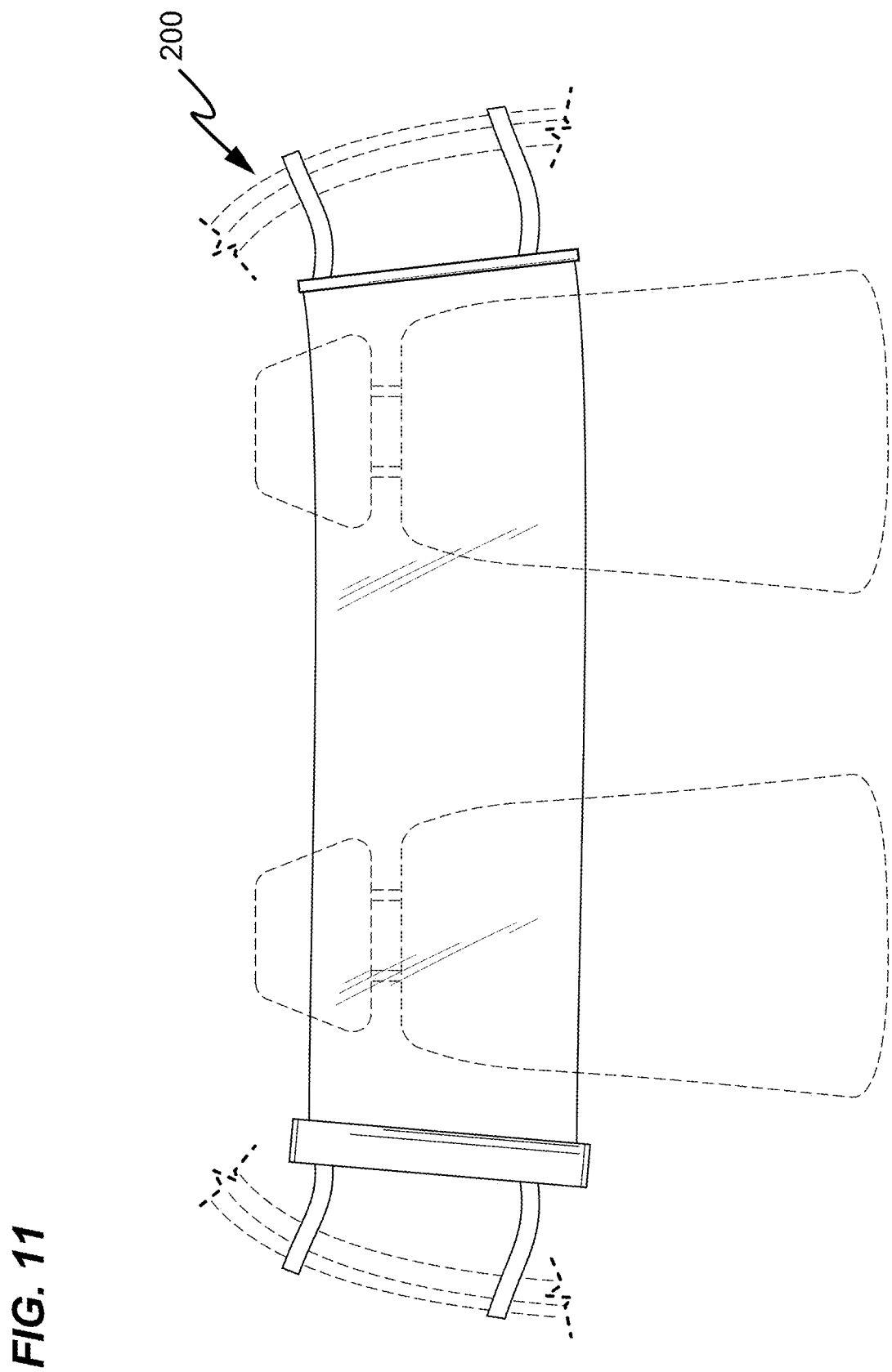
FIG. 11 is a front view of another embodiment of the retractable barrier system established in a multi-person vehicle, according to the present disclosure.

Now referring to FIGS. 9 through 11, a new retractable barrier system 200 for use in a multi-person vehicle embodying the principles and concepts of the disclosed subject matter will be described.

A retractable barrier system 200 may be suitable to form a barrier or obstruction across a space inside a multi-person vehicle. Illustratively, the interior space of a multi-person vehicle may be divided by an established barrier of the retractable barrier system 200. The barrier may effectively isolate persons inside the vehicle, reducing or preventing transmission of harmful biological substances among the persons.

In general, the barrier system 200 includes a barrier assembly 202, as shown in FIGS. 6A and 6B. The barrier assembly 202 includes a substantially enclosed housing 204. The housing 204 has an elongated body member 206 extending from a first end 208 to a second end 210 along a longitudinal axis 212. The housing 204 has a slotted opening 214 extended from the first end 208, or alternatively between the first end 208 and the second end 210, along the longitudinal axis 212. The slotted opening 214 has a width enough for passage of a sheet of a flexible substrate with thickness from about 0.5 mil to about 20 mil. The barrier assembly 202 includes an extendible and retractable barrier film 216. The barrier film 216 comprises a fixed edge 218, a major portion 220, and a free edge 222. The fixed edge 218 is enclosed and confined within the housing 204, and the major portion 220 is extendible through the slotted opening 214 and retractable in a storage configuration within the housing 204. The fixed edge 218 may be affixed to an interior part of the housing 204 via a fastening or mechanical mechanism described in the present disclosure.

The housing 204 may comprise a roller 224 enclosed therein. The fixed edge 218 is attached to the roller 224 through a fastening mechanism (not shown) a mechanical means (not shown) according to the present disclosure. In a storage configuration, the barrier film 216 is retracted onto the roller 224 in a roll form. The roller 224 with the barrier film rolled thereon may be configured to being slidably disposed into the housing 204 through the first end 208 and the slotted opening 214. An end of the roller is configured to removably attach to the second end 210 of the housing 204. The roller 224 may optionally comprise one or more shoulder washers or roller caps (not shown) known in the art, disposed at one or both ends of the roller 224 to support and/or guide winding and unwinding the barrier film 216. The barrier assembly 222 is configured to allow the free passage of the major portion 220 through the slotted opening 214 upon extension (unwinding the barrier film) or retraction (winding the barrier film). The free edge 222 may be placed outside the housing 204 in the storage configuration, which allows for easy extension of the barrier film 216 by pulling the free edge 222 to a desired length. The barrier assembly may comprise an edge holder or an edge protector 226 placed at the free edge 222, similar to the edge protector 126 according to the present disclosure. In the use configuration, the barrier film 216 may establish a barrier in a substantially upright or vertical configuration in the interior space of a multi-person vehicle. The barrier assembly 202 may be dimensioned to allow for applications in various vehicles. The housing and the barrier film may have various size, and/or length, and/or width depending on the application. In embodiments, the barrier film has a height from about 16 inches to about 84 inches.

Optionally, the barrier assembly 202 may further comprise a retracting mechanism 230 configured to exert a force retracting the extended barrier film 216 back into the housing 204. The retracting mechanism may be a biasing system or a spring-loaded roller, similar to the barrier system 100 according to the present disclosure. As an exemplary example, the housing 204 may enclose a spring-loaded roller 224 therein. The fixed edge 218 is fixed onto the spring-loaded roller 224, allowing the major portion 220 of the barrier film 216 be rolled onto the spring-loaded roller 224 in the storage configuration. As another exemplary example, a biasing system 230 may comprise a spring-loaded roller 224 configured to bias towards a retracted position wherein the major portion 220 of the barrier film 216 is retracted onto the spring-loaded roller 224 in the storage configuration. In practice, the biasing system is operatively arranged to exert a force on the extended barrier film and urge the spring-loaded roller to rotate in a direction to wind the barrier film toward the biased position.

The barrier assembly 202 may further include a first attachment mechanism 240 adapted to connect to a first interior part 250 of a multi-person vehicle. The first attachment mechanism 240 may be a removable adhesive or tape, a snap closure, a fastening closure, a hook-and-loop closure, a VELCRO® type fastener, a latch, a clasp, a button closure, a magnetic closure, a bracket, a locking mechanism, or other suitable closure mechanism. As an exemplary example, the first attachment mechanism 240 may comprise a hook-type fastener and a loop-type fastener. The hook-type fastener is placed on the body member of the housing, and the loop-type fastener is placed on the first interior part 250. The housing 204 can therefore be removably attached to the first interior part 250 of the multi-person vehicle via a hook-and-loop fastening mechanism. As another exemplary example, the first attachment mechanism 240 may be a VELCRO® type fastener strap connected to the housing 204, and the VELCRO® type fastener strap is configured to attach to the first interior part 250.

The free edge 222 may comprise a second attachment mechanism 242 configured to removably connect to a second interior part 252 of a multi-person vehicle. Similar to the first attachment mechanism 240, the second attachment mechanism 242 may be a removable adhesive or tape closure, a snap closure, a fastening closure, a hook-and-loop closure, a VELCRO® type fastener, a latch, a clasp, a button closure, a magnetic closure, a bracket, a locking mechanism, or other suitable closure mechanism. As an exemplary example, the free edge 222 may comprise one or more loops 242, and one or more corresponding hooks 242 are placed on the second interior part of the multi-person vehicle. The free edge 222 can therefore be removably attached to the second interior part 252 via a hook-and-loop mechanism to establish a barrier inside the vehicle. As another exemplary example, the second attachment mechanism 242 may be a VELCRO® type fastener strap connected to the free edge 222 or the edge holder 226, and the VELCRO® type fastener strap is configured to attach to the second interior part 252, thereby establishing a barrier.

The barrier system 200 may further comprise a receiving member 270 (not shown) capable of being removably attached to a second interior part 252 of the multi-person vehicle. The receiving member 270 is configured to receive and removably attach to the free edge 222 of the extended barrier film 216. The receiving member 270 may be any possible supporting structure described herein, including but not limited to a bar, or a rod, or a column, or a core, or a hollowed core, or a receiving housing. The second attachment mechanism 242 is configured to allow the free edge 222 to removably attach to the receiving member 270.

The barrier film 216 of the barrier system 200 may be any barrier film described in the present disclosure. The barrier film may have various translucency or optical properties depending on the application. The barrier film may be transparent, semi-transparent, see-through, substantially clear, translucent, or opaque. Optionally, the barrier film may comprise a writable or printable portion allowing to write, mark, print, sign, or label for displaying, decorating, reminding, warning, advertising, or other practical purposes.

The barrier film of the barrier system 200 may comprise a sanitary portion 236 according to the present disclosure. For example, the sanitary portion may be an antimicrobial or disinfecting component of the barrier film or an antimicrobial or disinfecting layer disposed onto at least one side of the barrier film 216.

The barrier system 200 may further include a sanitary mechanism 238 configured to apply an antimicrobial or disinfecting layer to at least one side of the barrier film 216, as described in the present disclosure. As an exemplary example, the sanitary mechanism comprises at least one felt strip 260 (or fabric strip or the like) removably attached to a surface of the housing near at least one side of the slotted opening 214 along the longitudinal axis 212 of the housing 204. In embodiments, two separate felt strips 260 may be removably attached respectively to a surface of the housing near each side of the slotted opening 114, both along the longitudinal axis 212 of the housing 204. The felt strip(s) is pre-impregnated with an antimicrobial or disinfecting liquid/composition (not shown) known in the art. The felt strip(s) 260 is configured to be in physical or pressured contact with at least one side of the barrier film 216 such that the pre-impregnated antimicrobial or disinfecting composition transfers onto the at least one side of the barrier film 216 upon extension or retraction.

The multi-person vehicle described herein encompasses any means of carrying or transporting persons, including but are not limited to wagons, motor vehicles (motorcycles, cars, trucks, buses), railed vehicles (trains, trams), watercraft (ships, boats), amphibious vehicles (screw-propelled vehicle, hovercraft), aircraft (airplanes, helicopters), and spacecraft.

The first interior part 250 and the second interior part 252 of a multi-person vehicle may be any two separate or spaced-apart interior parts that are able to support an established barrier by the barrier system. As an exemplary example, as shown in FIG. 9, a multi-person vehicle may be a four-door automobile having a front row and a back row. The first interior part is an interior surface of a vehicle pillar between a front door and a back door on the driver's side. The second interior part is an interior surface of an opposing pillar between a front door and a back door on the passenger's side. The housing 204 of the barrier system 200 is removably attached to the first interior part 250, and the free edge 222 of the barrier film 216 may be removably attached to the second interior part 252, or alternatively, removably attached to a receiving member 270 (not shown) that is attached to the second interior part 252. The extended barrier film 216 establishes a barrier isolating the first row and the second row, effectively preventing transmission of biological substances among persons. As another example, the first interior part and the second interior part can each independently be a headrest or an interior part of a seat, or a door frame, or a window frame, etc. Multiple barrier assemblies 202 may be used to establish multiple barriers isolating every two adjacent rows in a larger vehicle.

In embodiments for multi-person vehicles the method may include the following steps to reduce transmission of a biological substance. First, providing a barrier system according to the present disclosure, wherein the barrier system comprises: an elongated housing having a first end, a second end, a slotted opening between the first end and the second end, and a first attachment element, wherein the slotted opening is positioned along a longitudinal axis of the housing, wherein the first attachment element is adapted to connect to a first interior part of a multi-person vehicle; and an extendible and retractable barrier film having a height substantially equal to a length of the slotted opening, the barrier film comprising a fixed edge, a major portion, and a free edge, wherein the fixed edge is confined within the housing, the major portion is extendible through the slotted opening of the housing and retractable in a storage configuration within the housing. Second attaching the housing to a first interior part of a multi-person vehicle via a first attachment mechanism. Third, extending the barrier film to a desired length. Fourth, attaching the free edge of the barrier film to a second interior part of the multi-person vehicle via a second attachment mechanism, thereby establishing a substantially vertical barrier.

Now referring to FIGS. 12 through 13, a new handheld barrier system 300 embodying the principles and concepts of the disclosed subject matter will be described.

A handheld barrier system 300 may be suitable to form a barrier or obstruction across a public space. For example, the interior space of a multi-person vehicle may be divided by an established barrier of the handheld barrier system 300. The established barrier may effectively isolate persons inside the vehicle, reducing or preventing transmission of harmful biological substances among the persons.

A handheld barrier system 300 comprises: a first supporting member 302 having a first bar 304 and a first handle 306; a second supporting member 308 having a second bar 310 and a second handle 312; and an extendible and retractable barrier film 314 having a first edge 316 and a second edge 318, wherein the first edge 316 is fixed on the first bar 304 and the second edge 318 is fixed on the second bar 310, wherein the barrier film 314 is biased to a retracted position, wherein at least a part of the barrier film 314 is retracted on the first bar 304 and at least a part of the barrier film 314 is retracted on the second bar 310.

The supporting members and the barrier film may have various size, and/or length, and/or width depending on the application. In embodiments, the barrier film has a height from about 16 inches to about 84 inches.

Figure 12:
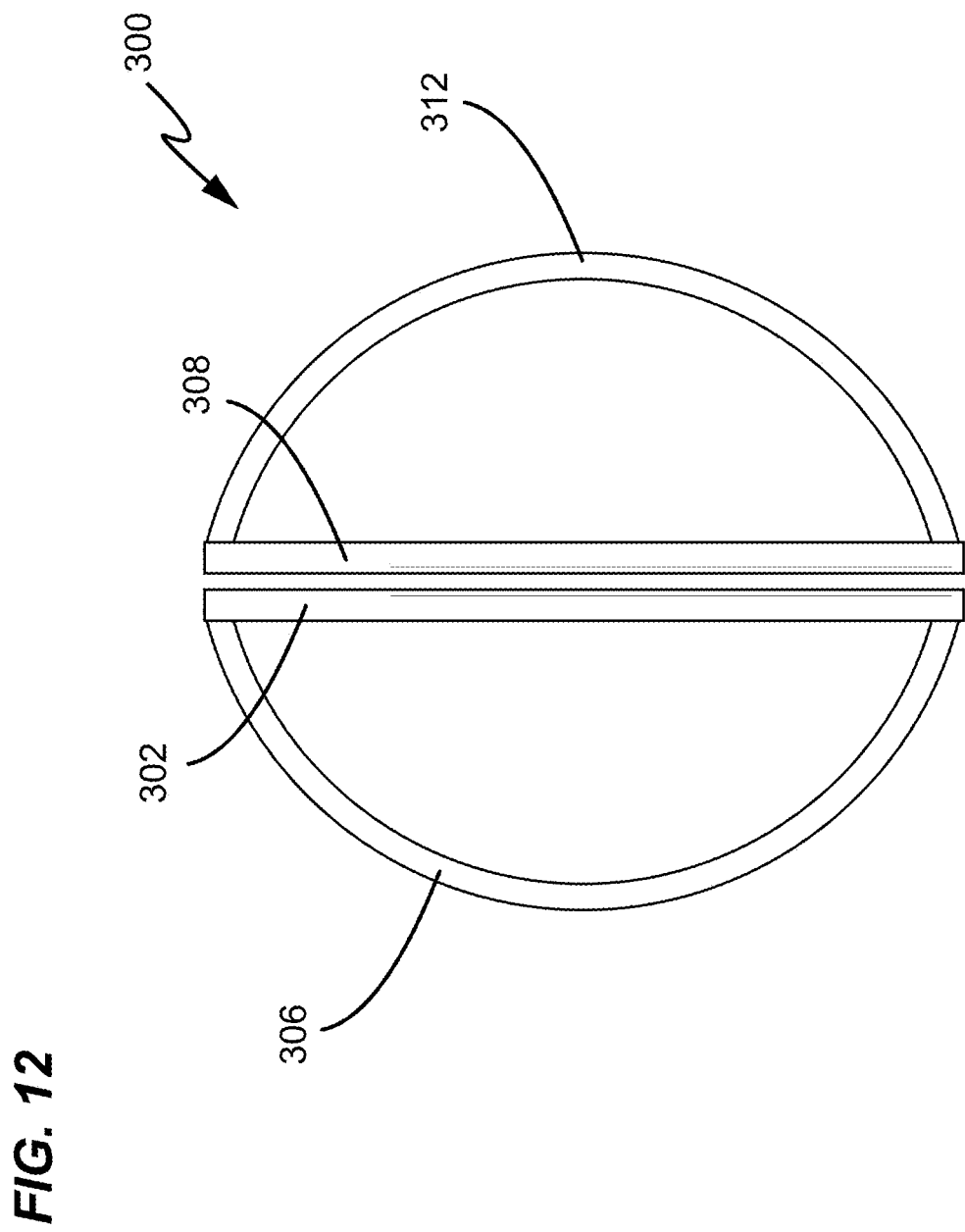
FIG. 12 is a perspective view of an embodiment of the handheld barrier system according to the present disclosure.
Figure 13:
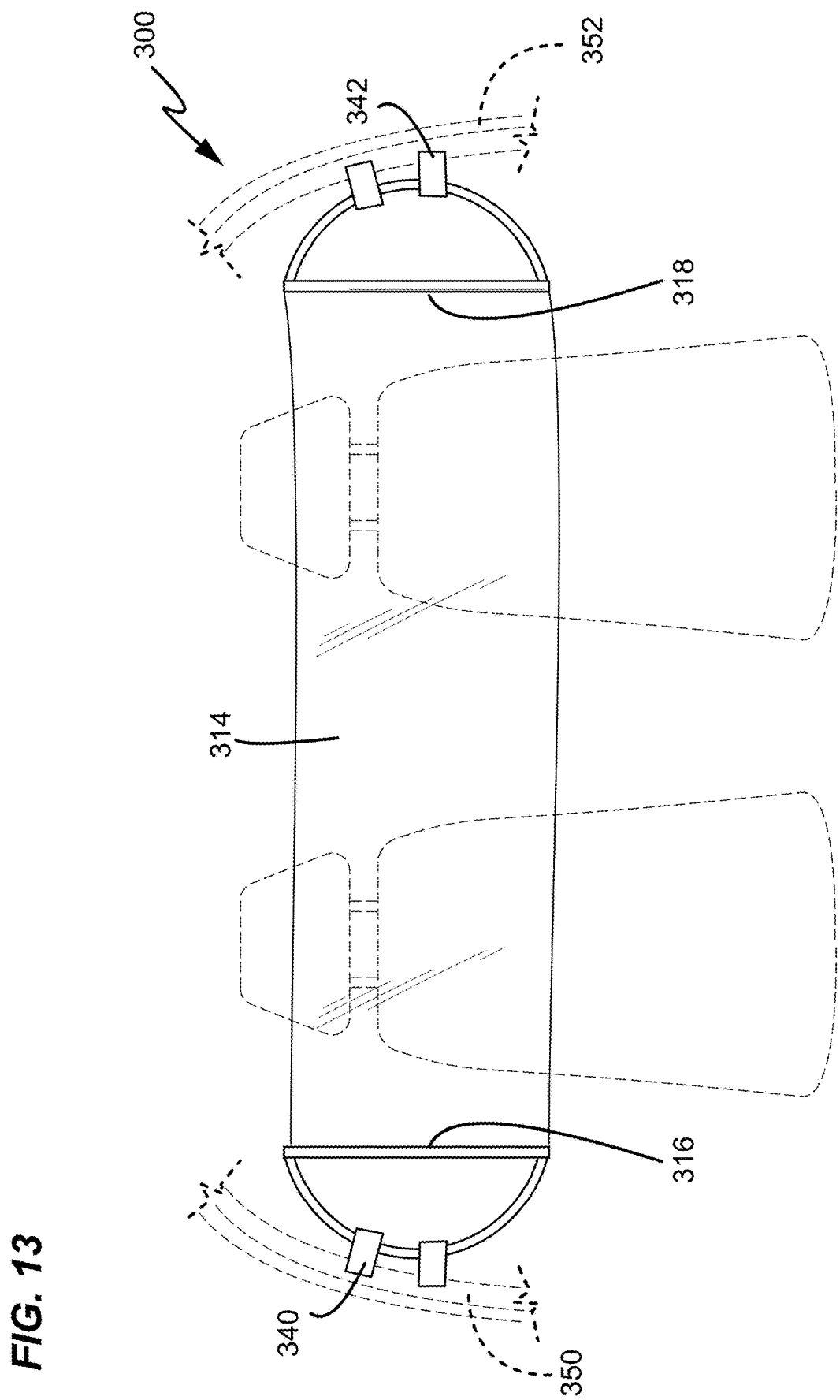
FIG. 13 is a perspective view of an embodiment of the handheld barrier system established in a multi-person vehicle, according to the present disclosure.

The first supporting member 302 and the second supporting member 308 may each be a closed-loop configuration as shown in FIG. 12. The two supporting members may be in close proximity when the barrier film is in the retracted position, which provides convenience to store, carry, and transport.

The barrier film 314 may have an inherent curl or a core-set curl, which biases the barrier film to the retracted position. Other biasing mechanisms may also be possible. For example, each of the bars 304 and 310 may be a spring-loaded bar, biasing the barrier film 314 to retract in a winding direction back onto the bars.

The barrier film 314 may be plastic film according to the present disclosure. The plastic film has a thickness of about 0.5 mil to about 20 mil, or from about 1 mil to about 10 mil, or from about 3 mil to about 7 mil.

The barrier film of the handheld barrier system 300 may comprise a sanitary portion as described herein. For example, the sanitary portion may be an antimicrobial or disinfecting component. The antimicrobial or disinfecting material may be disposed on at least one side of the barrier film 314. The handheld barrier system 300 may further include a sanitary mechanism configured to apply an antimicrobial or disinfecting layer to at least one side of the barrier film, as described in the present disclosure.

In operation, the handle of the first supporting member may be attached to a first stabilizing surface, and the handle of the second supporting member may be attached to second stabilizing surface apart from the first stabilizing surface, thereby extending the barrier film between the first supporting member and the second supporting member. For example, as shown in FIG. 13, in a multi-person vehicle (such as a four door automobile), the first handle 306 of the first supporting member 302 may be removably attached, via a first attachment mechanism 340, to a first interior part 350 of a vehicle pillar between a front door and a back door on the driver's side. The second handle 312 of the second supporting member 308 may be removably attached, via a second attachment mechanism 342, to a second interior part 352 of a vehicle pillar between a front door and a back door on the passenger's side. The first attachment mechanism 340 and the second attachment mechanism 342 may each independently be a removable adhesive or tape closure, a snap closure, a fastening closure, a hook-and-loop closure, a VELCRO® type fastener, a latch, a clasp, a button closure, a magnetic closure, a bracket, a locking mechanism, or other suitable closure mechanism. For example, the first interior part 350 and the second interior part 352 each independently comprises one or more hooks thereon, and the first handle 306 and the second handle 312 are each removably attached to the corresponding hook via a hook-and-loop closure mechanism, thereby establishing and stabilizing the barrier that isolates a first row and a second row of the multi-person vehicle. As another example, the handheld barrier system 300 may comprise two VELCRO® type fastening straps (not shown), each of which connected to each of the handles 306 and 312. The at least one VELCRO® type fastening strap is operably configured to respectively attach to the first interior part 350 and the second interior part 352, thereby establishing the barrier inside the vehicle. Multiple handheld barrier systems 300 may be used to establish multiple barriers isolating every two adjacent rows in a larger vehicle.

A method of reducing transmission of a biological substance in a multi-person vehicle comprises:

(1) providing a handheld barrier system according to the present disclosure, wherein the handheld barrier system comprises:
- a first supporting member having a first bar and a first handle;
- a second supporting member having a second bar and a second handle; and
- an extendible and retractable barrier film having a first edge and a second edge, wherein the first edge is fixed on the first bar and the second edge is fixed on the second bar,
- wherein the barrier film is biased to a retracted position, wherein at least a part of the barrier film is retracted on the first bar and at least a part of the barrier film is retracted on the second bar, (2) attaching the handle of the first supporting member to a first interior part of a multi-person vehicle;

(3) extending the barrier film to a desired length;

(4) attaching the handle of the second supporting member to a second interior part of the multi-person vehicle, thereby establishing a substantially vertical barrier.

The following numbered clauses define further example aspects and features of the present disclosure:

What is claimed is:

1. A barrier system comprising:
a first supporting member comprising a first attachment element, the first attachment element configured to position the barrier system vertically in use;
a transparent barrier film having a fixed edge and a free edge, wherein the fixed edge is connected to the first supporting member, wherein the barrier film comprises an antimicrobial portion or disinfecting surface configured to reduce or prevent transmission of a biological substance between organisms when the barrier film is extended; and
wherein the barrier film is extendible to a desired length in a use configuration and retractable back on the first supporting member in a storage configuration and wherein the first supporting member is configured to connect to a top of a first stabilizing member; and one of the first supporting member or the first attachment element comprises a receiving space configured to removably receive the top of the first stabilizing member.

2. The barrier system of claim 1, further comprising the first stabilizing member.

3. The barrier system of claim 2, wherein the first attachment element is removably attached to the first stabilizing member.

4. The barrier system of claim 1, further comprising a second supporting member, wherein the free edge of the barrier film is capable of being removably attached to the second supporting member.

5. The barrier system of claim 4, wherein the first supporting member and the second supporting member are each independently selected from the group consisting of a side wall, a bar, a core, a column, a casement, a housing, and combinations thereof.

6. The barrier system of claim 1, further comprising a retracting mechanism configured to exert a force retracting the extended barrier film back on the first supporting member in a storage configuration.

7. The barrier system of claim 6, wherein the retracting mechanism is selected from the group consisting of a crank, a lever, a loaded spring, or a biasing system.

8. The barrier system of claim 1, wherein the first stabilizing member is selected from the group consisting of a base, a floor surface, an interior part of a multi-person vehicle, a stanchion, a securable structure, or a weighted structure.

9. The barrier system of claim 1, wherein the barrier film is a plastic film.

10. The barrier system of claim 1, wherein the barrier film has sufficient stiffness or rigidity to reduce deformation upon extension or retraction.

11. The barrier system of claim 1, wherein the barrier film is UV resistant.

12. A retractable barrier system comprising:
an elongated housing having a first end, a second end, and a slotted opening between the first end and the second end, wherein the slotted opening is positioned along a longitudinal axis of the housing;
an extendible and retractable transparent barrier film having a height substantially equal to a length of the slotted opening, the barrier film comprising a fixed edge, a major portion, and a free edge, wherein the fixed edge is confined within the housing, the major portion is extendible through the slotted opening of the housing and retractable in a storage configuration within the housing, wherein the barrier film comprises an antimicrobial portion or disinfecting surface configured to reduce or prevent transmission of a biological substance between organisms when the barrier film is extended; and
a first adaptor positioned at the first end of the housing, the adaptor comprising a receiving space configured to removably receive a top end of a first stanchion,
wherein the barrier film is positioned vertically in use.

13. The retractable barrier system of claim 12, further comprising a retracting mechanism configured to exert a force retracting the extended barrier film back into the housing.

14. The retractable barrier system of claim 13, wherein the retracting mechanism is a crank, a lever, a loaded spring, or a biasing system.

15. The retractable barrier system of claim 12, further comprising an edge holder securely attached to the free edge of the barrier film, the edge holder dimensioned to prevent the free edge from being retracted into the housing.

16. The retractable barrier system of claim 12, wherein the barrier film is substantially clear.

17. The barrier system of claim 12, wherein the barrier film has a thickness of about 0.5 mil to about 20 mil, or from about 1 mil to about 10 mil, or from about 3 mil to about 7 mil.

18. A retractable barrier system for use in a multi-person vehicle, comprising:
an elongated housing having a first end, a second end, a slotted opening between the first end and the second end, and a first attachment element, wherein the slotted opening is positioned along a longitudinal axis of the housing, wherein the first attachment element is adapted to removably attach to a first interior part of a multi-person vehicle; and
an extendible and retractable transparent barrier film having a height substantially equal to a length of the slotted opening, the barrier film comprising a fixed edge, a major portion, and a free edge, wherein the fixed edge is confined within the housing, and wherein the major portion is extendible through the slotted opening of the housing and retractable in a storage configuration within the housing, wherein the barrier film is configured to move relative to the elongated housing in a substantially horizontal direction when in an installed position, and wherein the height of the barrier film is configured such that a top edge of the major portion is adjacent the roof of a multi-person vehicle and a bottom edge of the major portion is configured to be above the bottom half of a multi-person wherein the barrier film comprises an antimicrobial portion or disinfecting surface configured to reduce or prevent transmission of a biological substance between organisms when the barrier film is extended.

19. The retractable barrier system of claim 18, further comprising a retracting mechanism configured to exert a force retracting the extended barrier film back into the housing.

20. The retractable barrier system of claim 19, wherein the retracting mechanism is a spring-loaded roller or a biasing system.

21. The retractable barrier system of claim 18, wherein the free edge of the barrier film comprises a second attachment mechanism configured to removably connect to a second interior part of a multi-person vehicle, thereby establishing a barrier inside a multi-person vehicle.

22. A method of reducing transmission of a biological substance, the method comprising:
providing the barrier system of claim 1;
extending the barrier film to a desired length; and
attaching the free edge of the barrier film to a second supporting member, thereby forming a substantially vertical barrier.

23. The method of claim 22, wherein the barrier system further comprises a retracting mechanism configured to retract the extended barrier film back toward the first supporting member, wherein the retracting mechanism is a crank, a lever, a loaded spring, or a biasing system.

24. The method of claim 22, wherein the first supporting member comprises a first attachment element, the first attachment element configured to removably attach to a first stabilizing member.

25. The method of claim 22, wherein the second supporting member comprises a second attachment element, the second attachment element configured to removably attach to a second stabilizing member.

* * * * *